(12) United States Patent
Krause et al.

(10) Patent No.: US 7,904,576 B2
(45) Date of Patent: Mar. 8, 2011

(54) RELIABLE DATAGRAM VIA INDEPENDENT SOURCE DESTINATION RESOURCES

(75) Inventors: Michael R. Krause, Boulder Creek, CA (US); Fred B. Worley, Santa Clara, CA (US); Shankar G. Iyer, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 11/970,306

(22) Filed: Jan. 7, 2008

(65) Prior Publication Data
US 2008/0177890 A1 Jul. 24, 2008

Related U.S. Application Data

(63) Continuation of application No. 09/578,155, filed on May 23, 2000, now Pat. No. 7,318,102.

(60) Provisional application No. 60/135,664, filed on May 24, 1999, provisional application No. 60/154,150, filed on Sep. 15, 1999.

(51) Int. Cl.
*G06F 15/16* (2006.01)

(52) U.S. Cl. .......................... 709/230; 709/234; 709/236

(58) Field of Classification Search .................. 709/230, 709/234, 236
See application file for complete search history.

(56) References Cited

U.S. PATENT DOCUMENTS

| | | |
|---|---|---|
| 4,475,192 A | 10/1984 | Fernow et al. |
| 4,527,267 A | 7/1985 | Cohen |
| 4,713,806 A | 12/1987 | Oberlander et al. |
| 4,999,771 A | 3/1991 | Ralph et al. |
| 5,297,143 A | 3/1994 | Fridrich et al. |
| 5,408,465 A | 4/1995 | Gusella et al. |
| 5,506,964 A | 4/1996 | Beukema |
| 5,535,341 A | 7/1996 | Shah et al. |
| 5,553,083 A | 9/1996 | Miller |
| 5,699,500 A | 12/1997 | Dasgupta |
| 5,699,501 A | 12/1997 | Badovinatz et al. |
| 5,781,910 A | 7/1998 | Gostanian et al. |
| 5,790,544 A | 8/1998 | Aho et al. |
| 5,799,146 A | 8/1998 | Badovinatz et al. |
| 5,802,295 A | 9/1998 | Fukui et al. |
| 5,916,307 A | 6/1999 | Piskiel et al. |
| 5,926,101 A | 7/1999 | Dasgupta |

(Continued)

OTHER PUBLICATIONS

IBM Corp., "Direct Memory Access Tag Architecture," IBM Technical Disclosure Bulletin, vol. 32, No. 4B, pp. 143-151 (Sep. 1989).

(Continued)

*Primary Examiner* — John Follansbee
*Assistant Examiner* — Glenford Madamba

(57) ABSTRACT

A method includes producing units of work with at least one source application instance (AI) at a source device and consuming units of work with at least one destination AI at a destination device. A first reliable datagram service is established, with a first source and destination resource (SDR), between the source device and the destination device. A second reliable datagram service is established, with a second SDR independent of the first SDR, between the source device and the destination device. A first unit of work stream is transmitted over a communication services/fabric with the first reliable datagram service, which guarantees strong ordering of the first unit of work stream received at the destination device. A second unit of work stream is transmitted over the communication services/fabric with the second reliable datagram service, which guarantees strong ordering of the second unit of work stream received at the destination device.

25 Claims, 9 Drawing Sheets

U.S. PATENT DOCUMENTS

| | | | |
|---|---|---|---|
| 5,968,176 A | 10/1999 | Nessett et al. | |
| 5,987,506 A | 11/1999 | Carter et al. | |
| 5,999,964 A | 12/1999 | Murakata et al. | |
| 6,006,254 A | 12/1999 | Waters et al. | |
| 6,026,448 A | 2/2000 | Goldrian et al. | |
| 6,047,323 A | 4/2000 | Krause | |
| 6,064,672 A | 5/2000 | Van Loo et al. | |
| 6,070,219 A | 5/2000 | McAlpine et al. | |
| 6,088,736 A | 7/2000 | Manning et al. | |
| 6,092,220 A | 7/2000 | Palmer et al. | |
| 6,094,437 A | 7/2000 | Loehndorft, Jr. et al. | |
| 6,119,163 A | 9/2000 | Monteiro et al. | |
| 6,151,696 A | 11/2000 | Miller et al. | |
| 6,192,417 B1 | 2/2001 | Block et al. | |
| 6,205,150 B1 | 3/2001 | Ruszczyk | |
| 6,256,740 B1 | 7/2001 | Muller et al. | |
| 6,279,084 B1 | 8/2001 | VanDoren et al. | |
| 6,335,933 B1 | 1/2002 | Mallory | |
| 6,392,993 B1 | 5/2002 | Hamilton et al. | |
| 6,738,821 B1 | 5/2004 | Wilson et al. | |
| 7,318,102 B1 * | 1/2008 | Krause et al. | 709/230 |

OTHER PUBLICATIONS

Aguilar, Lorenzo, "Datagram Routing for Internet Multicasting," ACM, vol. 14, Issue 2, pp. 58-63 (Jun. 1984).

Aldrich, John M. et al., "How to Program a Set of Bits?" Google, Google Groups: comp.lang.c++, pp. 1-4 (Oct. 1997). <http://groups-beta.google.com>.

Armstrong, S. et al., "Multicast Transport Protocol," Network Working Group, Request for Comments: 1301, pp. 1-29 (Feb. 1992). <http://www.faqs.org/rfcs/rfc1301.html>.

Chang, Jo-Mei et al., "Reliable Broadcast Protocols," ACM Transactions on Computer Systems, vol. 2, No. 3, pp. 251-273 (Aug. 1984).

Cheriton, David R. et al., "Host Groups: A Multicast Extension for Datagram Internetworks," ACM, pp. 172-179 (1985).

Crowcroft, J. et al., "A Multicast Transport Protocol," ACM Press, pp. 247-256 (1988).

Diot, Christophe, "Reliability in Multicast Services and Protocols; A Survey," International Conference on Local and Metropolitan Communication Systems, 19 pages (Dec. 1994).

Fenner, W., "Internet Group Management Protocol, Ver. 2," Network Working Group, Request for Comments: 2236, pp. 1-18 (Nov. 1997). <http://www.faqs.org/rfcs/rfc2236.html>.

Information Sciences Institute, "Transmission Control Protocol", Darpa Internet Program Protocol Specification, pp. 1-68 (Sep. 1981). <http://www.faqs.org/rfcs/rfc793.html>.

Mockapetris, Paul V., "Analysis of Reliable Multicast Algorithms for Local Networks," ACM, pp. 150-157 (1983).

Paul, Sanjoy et al., "Reliable Multicast Transport Protocol (RMTP)," IEEE Journal on Selected Areas in Communications, vol. 15, No. 3, pp. 407-421 (Apr. 1997).

Rosenberg, Jerry M., "Dictionary of Computers, Information Processing, and Telecommunications," 2nd Edition (1990).

Shay, William A., "Understanding Data Communications and Networks," PWS Publishing Company, Chapter 5, pp. 260-281 (1995).

"FYI Questions and Answers," RFC 1594 (Mar. 1994).

* cited by examiner

RELIABLE DATAGRAM VIA INDEPENDENT SOURCE DESTINATION RESOURCES

CROSS REFERENCE TO RELATED APPLICATIONS

This Utility Patent Application is a Continuation of U.S. application Ser. No. 09/578,155 filed on May 23, 2000 now U.S. Pat. No. 7,318,102, which claims the benefit of the filing date of U.S. Provisional Applications Ser. No. 60/135,664, filed May 24, 1999 and U.S. Ser. No. 60/154,150, filed Sep. 15, 1999, all of which are herein incorporated by reference.

THE FIELD OF THE INVENTION

The present invention generally relates to data processing, and more particularly to communication between distributed application instances via a reliable datagram service.

BACKGROUND OF THE INVENTION

In conventional data processing systems, distributed application instances typically employ transport services, such as a reliable connection service or an unreliable datagram service, to communicate. An application instance is herein defined to be a producer or a consumer of data in the data processing system. An application instance can be implemented in software, hardware, or firmware, or in any combination of these. A unit of work is herein defined to be data which is transmitted between a source application instance and a destination application instance. Accordingly, a source application instance is the producer of the unit of work sent to the destination application instance. The destination application instance is the consumer of the unit of work sent from the source application instance.

A portion of a conventional data processing system employing a reliable connection service to communicate between distributed application instances is illustrated generally at 30 in FIG. 1. Conventional data processing system 30 includes an application instance A indicated at 32, an application instance B indicated at 34, and an application instance C indicated at 36. The reliable connection service of data processing system 30 creates at least one non-sharable resource connection between each connected pair of communicating application instances. For example, a first non-sharable resource connection 38 and a second non-sharable resource connection 40 are created between application instance A indicated at 32 and application instance B indicated at 34. A third non-sharable resource connection is created between application instance A indicated at 32 and application instance C indicated at 36. Each non-sharable resource connection includes a unique set of non-sharable resources. The reliable connection service transmits units of work between application instances by identifying a source connection handle and by issuing appropriate instructions to control data transmission. Reliable connection services provide reliable communication between application instances, but at the cost of scalability of the data processing system. In reliable connection services, communication at any one time is restricted to one-to-one application instance relationships via corresponding non-sharable resource connections.

A portion of a conventional data processing system employing an unreliable datagram service to communicate between application instances is illustrated generally at 50 in FIG. 2. Conventional data processing system 50 includes an application instance A indicated at 52, an application instance B indicated at 54, and an application instance C indicated at 56, and an application instance D indicated at 58. The unreliable datagram service employed by data processing system 50 creates a shared resource datagram 60. Shared resource datagram 60 can be employed to transmit units of work between multiple application instances. Shared resource datagram 60 couples application instance A indicated at 52 to application instance B indicated at 54, to application instance C indicated at 56, and to application instance D indicated at 58. Unreliable datagram services provide for highly scalable data processing systems, but at the cost of reliability. In an unreliable datagram service, the application instance relationships can be one-to-one, one-to-many, or many-to-one, but communication between application instances is not reliable. In particular, traditional unreliable datagrams do not provide guaranteed ordering of units of work transmitted between application instances.

For reasons stated above and for other reasons presented in greater detail in the Description of the Preferred Embodiments section of the present specification, there is a need for an improved transport service for communicating between distributed application instances in data processing systems. The improved transport service should provide reliable communication between application instances including guaranteed ordering of units of work transmitted between application instances. In addition, the improved transport service should provide for highly scalable data processing systems.

SUMMARY OF THE INVENTION

One embodiment provides a method of processing data including producing units of work with at least one source application instance (AI) at a source device and consuming units of work with at least one destination AI at a destination device. The method includes establishing a first reliable datagram service, with a first source and destination resource (SDR), between the source device and the destination device and establishing a second reliable datagram service, with a second SDR independent of the first SDR, between the source device and the destination device. The method includes transmitting a first unit of work stream over a communication services/fabric with the first reliable datagram service and guaranteeing strong ordering of the first unit of work stream received at the destination device with the first reliable datagram service. The method includes transmitting a second unit of work stream over the communication services/fabric with the second reliable datagram service, and guaranteeing strong ordering of the second unit of work stream received at the destination device with the second reliable datagram service.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
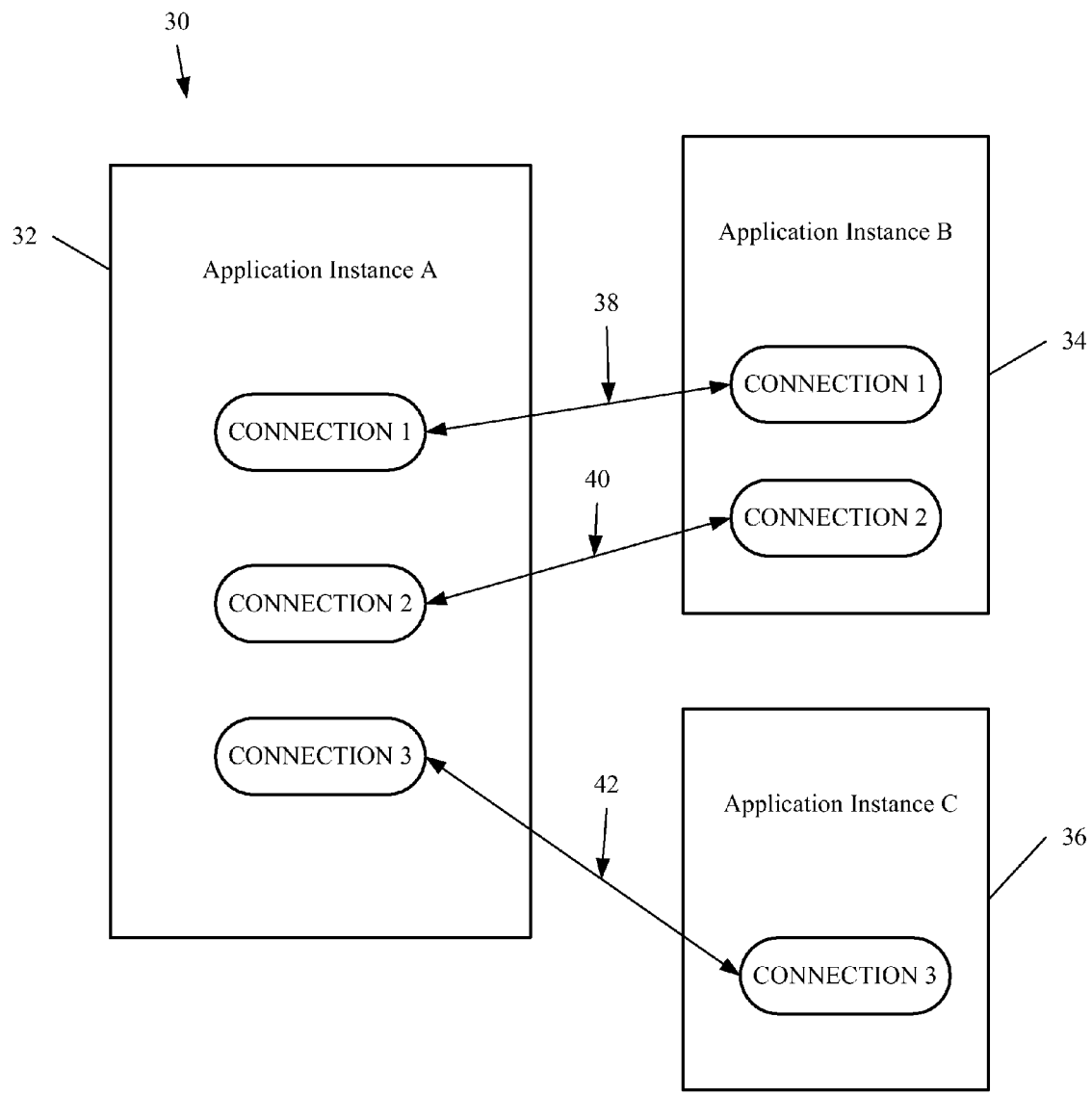
FIG. 1 is a diagram of a conventional data processing system employing a reliable connection service to communicate between distributed application instances.
Figure 2:
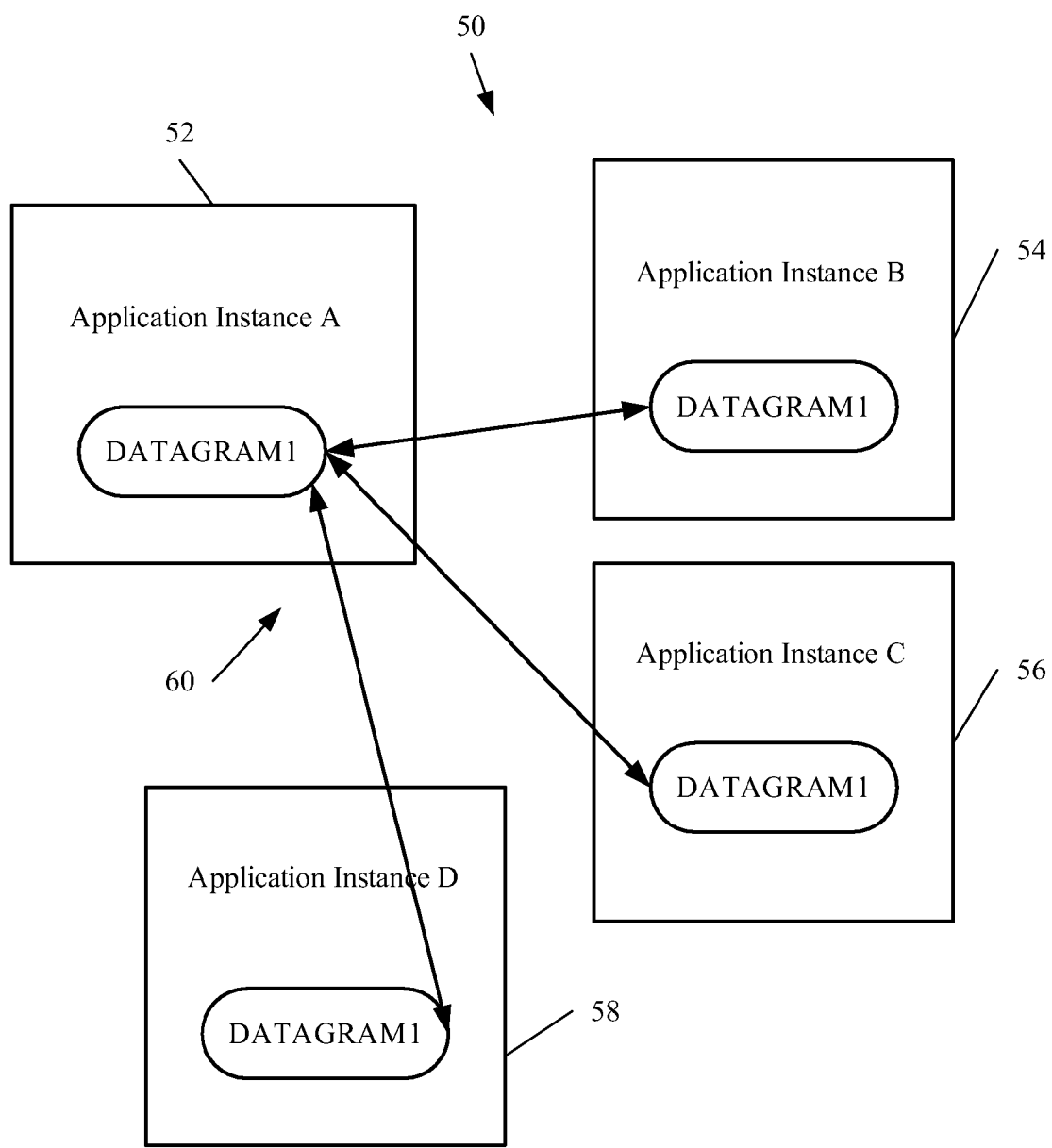
FIG. 2 is a diagram of a portion of a conventional data processing system employing an unreliable datagram service to communicate between application instances.
Figure 3:
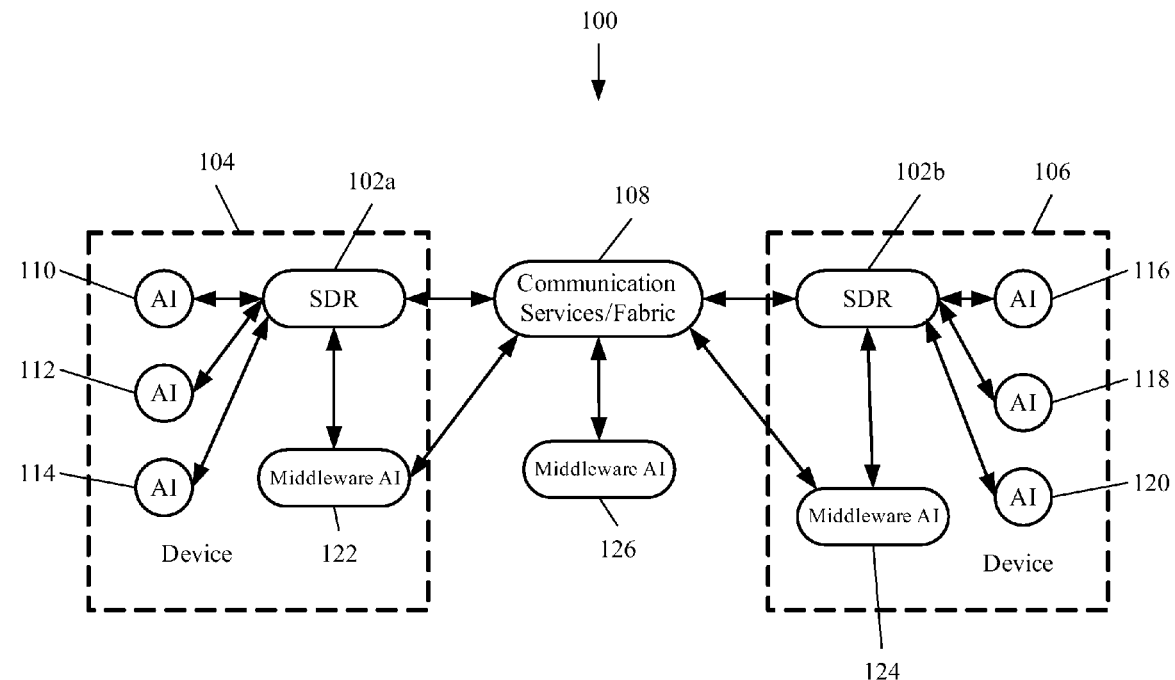
FIG. 3 is a diagram of a portion of a data processing system according to the present invention employing a reliable datagram service for providing reliable communication between distributed application instances.

A portion of a data processing system according to the present invention is illustrated generally at 100 in FIG. 3. Data processing system 100 includes a reliable datagram service according to the present invention for providing reliable communication between distributed application instances (AIs). The reliable datagram service according to the present invention also provides for a highly scalable data processing system 100.

Data processing system 100 includes a source and destination resource (SDR) 102 for implementing a reliable datagram service between a device 104 and a device 106. SDR 102 comprises SDR resources 102a at device 104 and SDR resources 102b at device 106. SDR resources 102a communicate with SDR resources 102b via a communication services/fabric 108. Device 104 and device 106 can each be a source or a destination device depending on the direction of communication. Device 104 includes an AI 110, an AI 112, and an AI 114. Device 106 includes an AI 116, an AI 118, and an AI 120. AIs produce or consume data. AIs can be implemented in software, hardware, or firmware, or in any combination of these.

A first step in implementing a reliable datagram service between source and destination devices, such as devices 104 and 106, is to create a SDR according to the present invention, such as SDR 102, upon which reliable communication can be implemented in a scalable data processing system. A variety of suitable techniques can be used to create a SDR according to the present invention. One such suitable technique employs an unreliable datagram service between middleware AIs on the source and destination devices, such as middleware AI 122 on device 104 and middleware AI 124 on device 106. The middleware AIs exchange sufficient data to uniquely identify the SDR which will be employed to exchange reliable datagrams. Middleware AIs facilitate communication between AIs either directly, such as by providing a communication application programming interface (API) and library, or indirectly, such as by providing transparent error recovery and other management services. Middleware AIs can be implemented in hardware via a state machine, in firmware, or in software within a given device, such as devices 104 and 106. One embodiment of a middleware AI (e.g., middleware AIs 122 and 124) operates local to the AIs within the same device. One embodiment of a middleware AI, such as middleware AI 126, executes remotely and is accessed via the underlying communication services/fabric.

Once a SDR according to the present invention is established, any number of source AIs can employ the established SDR, such as SDR 102, to communicate to any number of destination AIs, because the established SDR functions as a point of multiplexing at the source device and as a point of demultiplexing at the destination device.

In an example operation of SDR 102, device 104 is a source device and device 106 is a destination device. In this example operation, AIs 110, 112, and 114 of source device 104 are source AIs which produce units of work transmitted to the destination device 106. In this example operation, AIs 116, 118, and 120 are destination AIs which consume the units of work transmitted from corresponding source AIs 110, 112, and 114. In this example operation, SDR resources 102a at source device 104 multiplex units of work produced by source AIs 110, 112, and 114 into a serial unit of work stream provided on communication services/fabric 108. The serial unit of work stream is demultiplexed by SDR resources 102b at destination device 106 into units of work consumed by AIs 116, 118, and 120. In this example operation, SDR resources 102b validate the delivery of units of work, generate positive acknowledgements (ACKs) and negative acknowledgments (NAKs), and perform resynchronization operations based on any detected errors.

The reliable datagram service implemented with a SDR, such as SDR 102, provides for distributed AI communication using one-to-one, one-to-many, or many-to-one AI relationships. In addition, AIs can operate within the same device via a device backplane fabric (e.g., a form of shared memory within a device) or between disparate devices which are connected via an intermediate communication fabric. Therefore, the communications between AIs is independent of the physical locality of the AIs and is connectionless from the perspective of the AIs.

A unit of work is data transmitted between a source AI and a destination AI. In one embodiment, the units of work are treated as opaque objects by the underlying communication services/fabric. In one embodiment, however, the underlying communication services/fabric performs optional filtering services on the units of work based on the capability of the underlying communication services/fabric and the requirements of the middleware AIs and AIs.

The reliable datagram service according to the present invention includes the following mechanisms to assure reliable transmission of the units of work between the source AIs and the destination AIs. A strong ordering mechanism in the SDR guarantees that the destination AIs receive the units of work in the same order that the corresponding source AIs sent the unit of work. Units of work sent by other source AIs to the same destination AI using separate SDRs may be interleaved. Strong ordering is only guaranteed on a one-to-one source AI-to-destination AI resource basis.

A second mechanism for assuring reliable transmission of the units of work between the source AIs and the destination AIs is that a given unit of work is received by the destination SDR resources exactly once. In other words, duplicate copies of units of work which may be generated during an error event or a recovery operation are detected and not delivered to the destination AI.

A third mechanism for assuring reliable transmission of the units of work between the source AIs and the destination AIs is an acknowledgement mechanism. The source AI and/or the communication services/fabric are informed of a unit of work transmission completion either via a positive acknowledgement (ACK) which indicates a unit of work was successively transmitted and received or a negative acknowledgement (NAK) which indicates an unrecoverable error was detected either within the unit of work or in its transmission. In one embodiment, a source AI is notified of an error through out-of-band communication, such as an alarm generated by the underlying communication services/fabric when a hardware failure is detected.

In one embodiment, AIs use the same sender-based or receiver-based communication and memory management/protection techniques as traditionally used by reliable connections services. In addition, AIs can implement other reliable operations and additional reliable techniques utilizing reliable datagrams which are not normally implemented using reliable connections.

Logical unit of work transmission size is limited only by the size of the memory window exported (sender-based communication) or posted (receiver-based communication) by the destination AI. Receiver-based AIs can support one or multiple memory buffers as transmission targets. The receiver communication services/fabric are responsible for selecting the optimal memory buffer to target for a given unit of work based on unit of work attributes or AI input.

Memory is protected using techniques such as Hamlyn protection mechanisms to ensure correct access rights (e.g., no access, read access, write access, read/write access, memory address range verification, and the like) are verified before access is granted to an AI.

Figure 4:
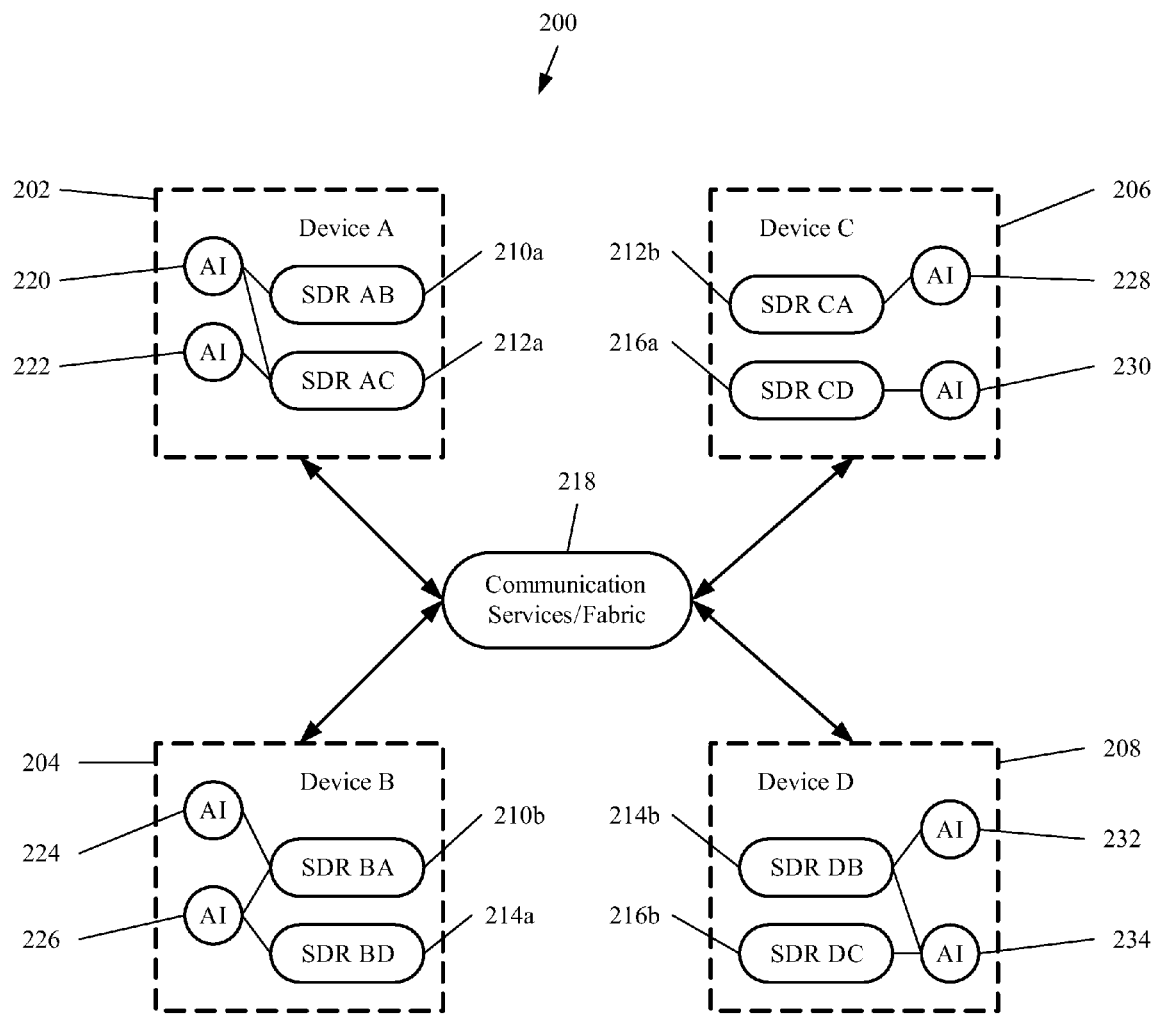
FIG. 4 is a diagram of a portion of a data processing system according to the present invention having multiple source and destination resources (SDRs) for implementing a reliable datagram service between multiple devices.

A portion of a data processing system according to the present invention having multiple SDRs is illustrated generally at 200 in FIG. 4. Data processing system 200 includes a device A indicated at 202, a device B indicated at 204, a device C indicated at 206, and a device D indicated at 208. A SDR 210 including SDR resources 210*a* at device 202 and SDR resources 210*b* at device 204 implements a reliable datagram service between device 202 and device 204. A SDR 212 including SDR resources 212*a* at device 202 and SDR resources 212*b* at device 206 implements a reliable datagram service between device 202 and 206. A SDR 214 including SDR resources 214*a* at device 204 and SDR resources 214*b* at device 208 implements a reliable datagram service between device 204 and 208. A SDR 216 including SDR resources 216*a* at device 206 and SDR resources 216*b* at device 208 implements a reliable datagram service between device 206 and device 208. The source and destination ends of each of the SDRs 210, 212, 214, and 216 communicate via a communication services/fabric 218. Devices 202, 204, 206, and 208 can each be a source or a destination device depending on the direction of communication.

Device 202 includes an AI 220 coupled to SDR resources 210*a* and SDR resources 212*a*; and an AI 222 coupled to SDR resources 212*a*. Device 204 includes an AI 224 coupled to SDR resources 210*b*; and an AI 226 coupled to SDR resources 210*b* and SDR resources 214*a*. Device 206 includes an AI 228 coupled to SDR resources 212*b*; and an AI 230 coupled to SDR resources 216*a*. Device 208 includes an AI 232 coupled to SDR resources 214*b*; and an AI 234 coupled to SDR resources 214*b* and SDR resources 216*b*.

Thus, for each <source, destination> device tuple, one or more SDRs are established (e.g., SDR 210 is established for the device 202-device 204 tuple). The AIs on each device can communicate to any AI on another device to which they are coupled through an associated SDR. One or more SDRs can be associated with a given physical fabric device allowing traffic segregation and multiple topologies to be supported.

Example Reliable Communication Protocol

The above-described strong ordering mechanism, the mechanism providing that a given unit of work is received by the destination SDR resources exactly once, and the acknowledge mechanism, which together assure reliable transmission of the units of work between the source AIs and the destination AIs, can be implemented according to the following example reliable communication protocol.

The example reliable communication protocol includes serializing all units of work which are transmitted between a source AI and a corresponding destination AI into a unit of work stream. The serialization of the units of work into a unit of stream is accomplished as follows. In one embodiment, each unit of work is treated as an opaque object which is encapsulated within a protocol header for transmission. A protocol header contains the fields employed by the underlying communication services/fabric to target the destination AI.

Figure 5:
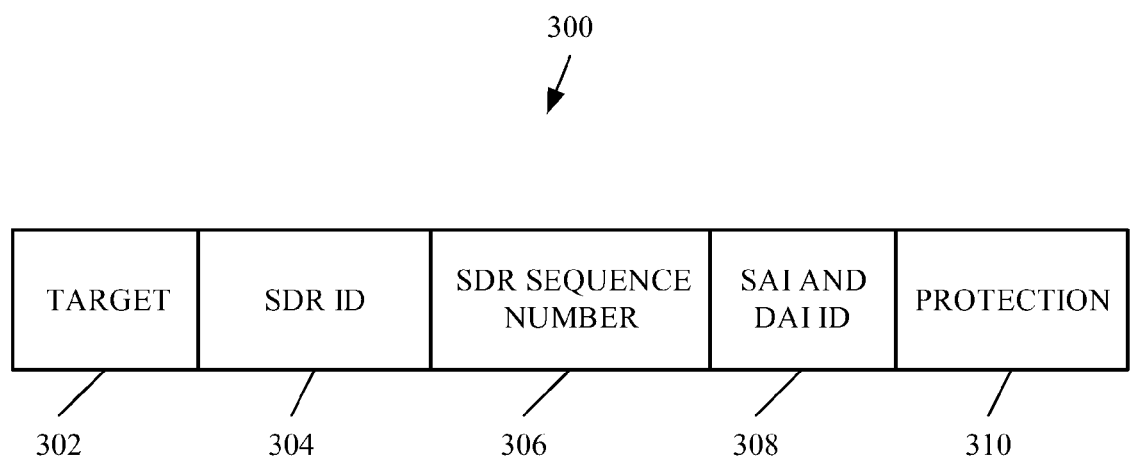
FIG. 5 is a diagram of one embodiment of a protocol header according to the present invention containing fields employed an underlying communication services/fabric to target a destination application instance in a reliable datagram service according to the present invention.

One example embodiment of a protocol header is illustrated generally at 300 in FIG. 5. Protocol header 300 includes target fields 302 which are employed by the underlying communication services/fabric to target the destination AI. A SDR identifier field 304 uniquely identifies the SDR employed to send and receive the units of work. All communication requiring strong ordering must flow through the same SDR. Strong ordering is not guaranteed across SDRs within the same device.

A SDR sequence number field 306 provides a unique logical time stamp representing a defined order of the units of work in the unit of work stream transmitted from the source SDR resources and is employed by the destination SDR resources for verifying that units of work are arriving in order and for detecting if any units of work are missing. The successive protocol headers in a given serial unit of work stream contain monotonically increasing number values in their respective SDR sequence number fields, which are assigned per SDR.

If the SDR sequence number field 306 value matches the expected sequence number valve stored in the destination SDR resources, then other protocol header 300 fields are verified by the destination SDR resources. The destination SDR resources provide an ACK if the current unit of work is determined to be valid from the destination device's perspective. The destination SDR resources provide a NAK if the current unit of work is determined to be invalid from the destination device's perspective.

The SDR sequence number field 306 value being less than an expected next sequence number value stored in the destination SDR resources indicates that the unit of work is a duplicate unit of work and the unit of work is dropped by the destination SDR resources. In one embodiment, the duplicate unit of work is silently dropped by the destination SDR resources. In one embodiment, the destination SDR resources drop the duplicate unit of work and provide an ACK indicating to the source SDR resources that the last unit of work was received to avoid the source SDR resources from again transmitting the duplicate unit of work in case the previous ACK corresponding the firstly received unit of work with the same SDR sequence number was dropped.

The SDR sequence number field 306 value being greater than the expected next sequence number value stored in the destination SDR resources indicates that the current unit of work is received ahead of its defined order, and thus, an intermediate unit of work is missing. A first option for responding to the indication that an intermediate unit of work is missing is for the destination SDR resources to silently drop the current unit of work and await the source SDR resources to retransmit the missing unit of work based, for example, on a timer expiring.

A second option for responding to the indication that an intermediate unit of work is missing is for the destination SDR resources to provide a NAK, which contains the expected next sequence number value in the SDR sequence number field of the protocol header of the NAK, indicating to the source SDR resources that an intermediate of work is missing. In one embodiment implementing the second option, the unit of work is dropped and the NAK indicates to the source SDR resources the sequence number of the missing intermediate unit of work. The source SDR resources respond to the NAK and retransmit all units of work having an assigned SDR sequence number value equal to or greater than the SDR sequence number value corresponding to the missing intermediate unit of work.

In another embodiment implementing the second option for responding to the indication that an intermediate unit of work is missing, the destination SDR resources verify other protocol header fields. If all other verification checks pass, the destination SDR resources temporarily store the current unit of work, while the middleware AIs perform a resynchronization operation to recover the missing intermediate unit of work.

Resynchronization is herein defined to be the process employed to synchronize the SDR associated with a given <source AI, destination AI> tuple. In other words, resynchronization aligns the SDR contents to determine what units of work have been posted for transmission, what units of work have been reliably completed, and what units of work need to be retransmitted. The resynchronization process is primarily controlled by the SDR sequence number values associated with a given SDR to retransmit and/or clean up the non-completed units of work. While resynchronization is performed strictly on an implementation dependent basis, the resynchronization process can also employ a barrier control message containing SDR state and control values, such as SDR sequence numbers and acknowledgment numbers, where the barrier control message is transmitted between the source and destination devices.

Error recovery for a given <source AI, destination AI> tuple typically involves performing a resynchronization event between the resources associated with the source AI and the destination AI. The resources associated with the source AI and the destination AI contain sufficient state information to recover all operations which have not been completed (i.e., neither an ACK nor a NAK has been received by the source AI to complete the unit of work transmission). The resource and the unit of work state information can be maintained at any location within the source and destination devices.

The example protocol header 300 illustrated in FIG. 5 also includes source AI and destination AI identifier fields 308. The source AI and destination identifier fields 308 are employed to perform completion events, identify the source AI to the destination AI for subsequent application-specific exchanges, and the like.

If the AIs are employing sender-based communication, example protocol header 300 contains additional protection fields 310. Example protection fields 310 includes Hamlyn-style protection key, memory buffer address and offsets, and the like. Protection fields 310 are validated by the destination SDR resources before memory access is granted.

According to the example reliable communication protocol, each unit of work must be acknowledged using either an ACK, a NAK, or a communication services/fabric error notification. Acknowledgments are used to indicate whether a unit of work has reached the destination SDR resources and some form of action has been performed in response thereto.

In one embodiment, the acknowledgments (e.g., ACK, NAK, and communication services/fabric error notification) are implemented as stand-alone unit of work exchanges which are separate and well defined. In one embodiment, the acknowledgments are encapsulated in the unit of work within a protocol header. In one embodiment, the acknowledgments are formed as a component within a protocol header which is either transmitted separately or piggy-backed within another unit of work being transmitted in the other direction.

In one embodiment, ACKs are on a per unit of work basis. In this embodiment, a separate ACK is transmitted for each unit of work which is successfully received and processed by the destination SDR resources. In another embodiment, the ACKs are cumulative. In the cumulative ACK embodiment, for a given set of units of work, a single ACK is transmitted with the embedded SDR sequence number indicating that all units of work in the set of units of work up to and including the unit of work assigned the current SDR sequence number have been successfully received and processed by the destination SDR resources. An AI can have multiple units of work in-flight at any given time depending upon the underlying communication services/fabrics capabilities. The number of units of work that a given AI can have in-flight at a given time is not limited by the possible scope of the reliable datagram service according to the present invention, but can possibly be limited by specific implementation details of the SDRs and the underlying communication services/fabric capabilities.

In one embodiment, NAKs are generated on a per unit of work basis for each unit of work which is incorrectly received at the destination SDR resources. Example reasons for a unit of work to be incorrectly received at the destination SDR resources include cyclic redundancy check (CRC) error, protection violation, resource shortage, unrecognized destination AI, and the like. For each unit of work which is incorrectly received, a NAK is transmitted from the destination SDR resources and the NAK includes appropriate information to allow the source AI or the underlying communication services/fabric to determine the recovery action to perform in response to the NAK. If the NAK does not require a resynchronization event, the NAK serves as an acknowledgment for the unit of work to allow subsequent units of work flowing through the same destination SDR resources to be processed as through no error had occurred.

Acknowledgments (e.g., ACK, NAK, and communication services/fabric error notification) act as synchronization events between the source and destination ends of a SDR coupling the two devices of a <source, destination> device tuple to ensure that all units of work transmitted from the source device, independent of the AIs involved, are reliably delivered to the destination device. In one embodiment, acknowledgments also act as acknowledgments at the AI level, allowing a source AI to be assured that the units of work transmitted from the source AI are reliably delivered to a corresponding destination AI. In this embodiment, unit of work retirement is automatically processed based on ACKs.

Thus, there is a distinction between units of work delivered to a destination device and units of work delivered to a destination AI on the destination device. Delivery location and acknowledgement semantics determines what responding action the source AI should perform. For example, if a unit of work is delivered to the destination device but not to the destination AI, the source AI cannot assume that the unit of work has actually been consumed by the destination AI, and thus, the source AI must be careful as to whether subsequent actions should be performed.

An illustrative example is as follows, if a source AI is moving a disk block from a first device to a first destination AI on a second device and then transferring ownership of the disk block to a second destination AI on a third device, the source AI needs to be assured that the disk block was actually received by the first destination AI and was acted upon by the first destination AI before the source AI transfers ownership to the second destination AI. If the disk block was not actually received by the first destination AI or was not acted upon by the first destination AI before the source AI transfers ownership to the second destination AI, a subsequent failure within the first destination AI could result in the second destination AI disk block owner reading stale data.

Example Transmission Operations

Figure 6:
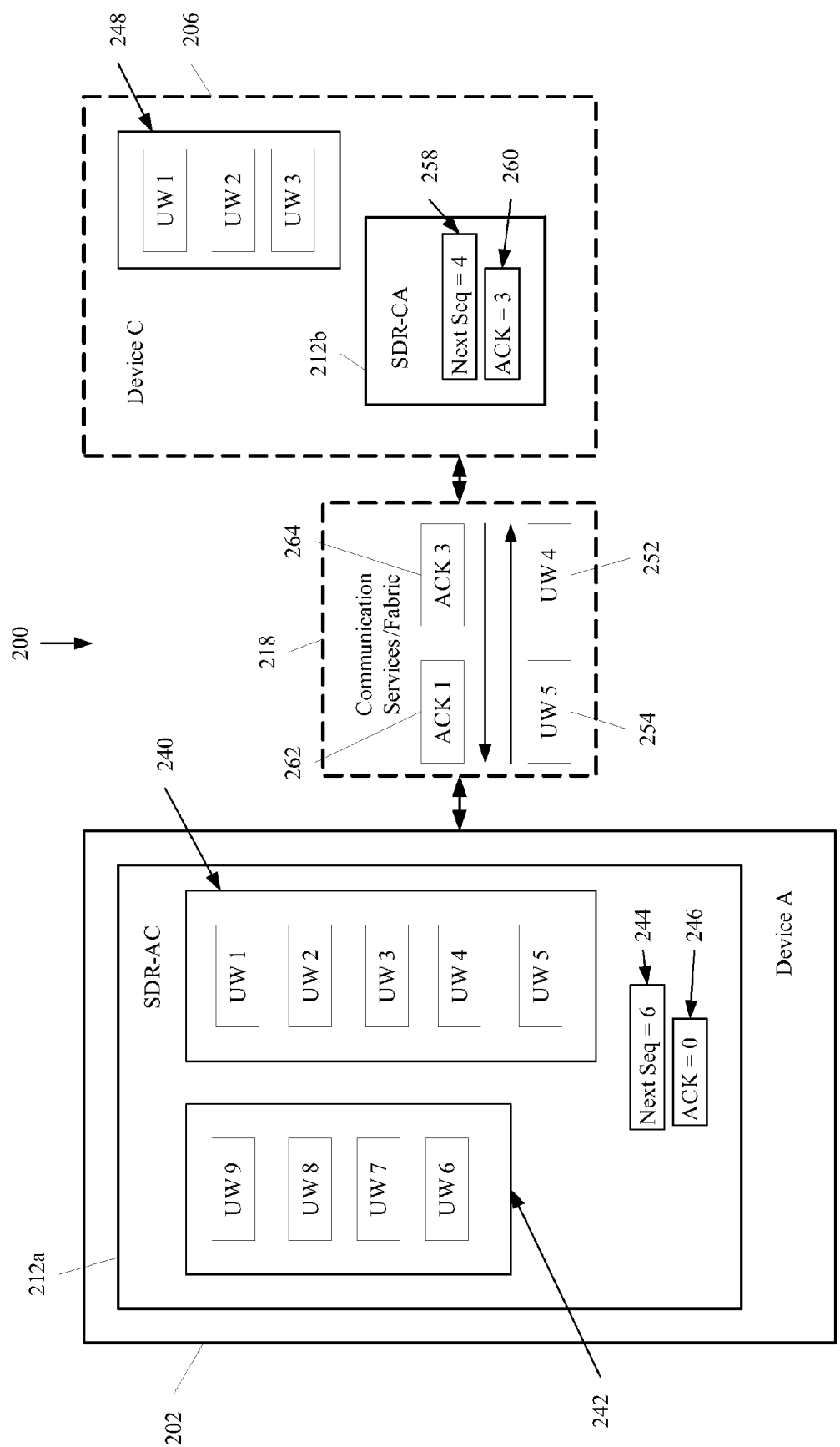
FIG. 6 is a diagram illustrating an example transmission operation between a source device and a destination device for the data processing system of FIG. 4.

An example transmission operation between source device A indicated at 202 and destination device C indicated at 206 for data processing system 200 is illustrated in diagram form in FIG. 6. As indicated in FIG. 6, SDR resources 212a at source device 202 include a queue 240 holding transmitted but not ACKed units of work and a queue 242 holding units of work not yet transmitted. At the time indicated in FIG. 6, queue 240 includes the following units of work: UW1; UW2; UW3; UW4; and UW5. The units of work held in queue 240 have been processed and transmitted by SDR resources 212a of source device 202. At the time indicated in FIG. 6, queue 242 includes the following units of work: UW6; UW7; UW8; and UW9. SDR resources 212a also store an expected next sequence number value 244 which is equal to 6 at the time indicated in FIG. 6. SDR resources 212a also store an ACK value 246, which is equal to 0 at the time indicated in FIG. 6.

As illustrated in FIG. 6, destination device C indicated at 206 includes a queue 248 holding received units of work. The received units of work held in queue 248 at the time illustrated in FIG. 6 include: UW1; UW2; and UW3. As indicated respectively at 252 and 254, the units of work UW4 and UW5, which have been transmitted from SDR resources 212a, are on the communication services/fabric 218 at the time indicated in FIG. 6. At the time indicated in FIG. 6, SDR resources 212b include an expected next sequence number value 258 which is equal to 4 and an ACK value 260 which is equal to 3. SDR resources 212b have transmitted a stand alone ACK, indicated at 262, for the received unit of work UW1 and a cumulative ACK, indicated at 264, for the received units of work UW2 and UW3. Again, the decision to transmit ACKs as stand alone ACKs or cumulative ACKs is implementation dependent. In one embodiment, a piggy-back ACK on a unit of work flowing from destination device 206 to source device 202 can be employed to carry the ACK back to source device 202. As units of work are transmitted, source device 202 and destination device 206 track what units of work have been acknowledged via ACK value 246 for device 202 and ACK value 260 for device 206. As units of work are transmitted, devices 202 and 206 via SDRs 212a and 212b also track the expected next sequence numbers via expected next sequence number value 244 for device 202 and expected next sequence number value 258 for device 206 to ensure reliability is maintained.

Figure 7:
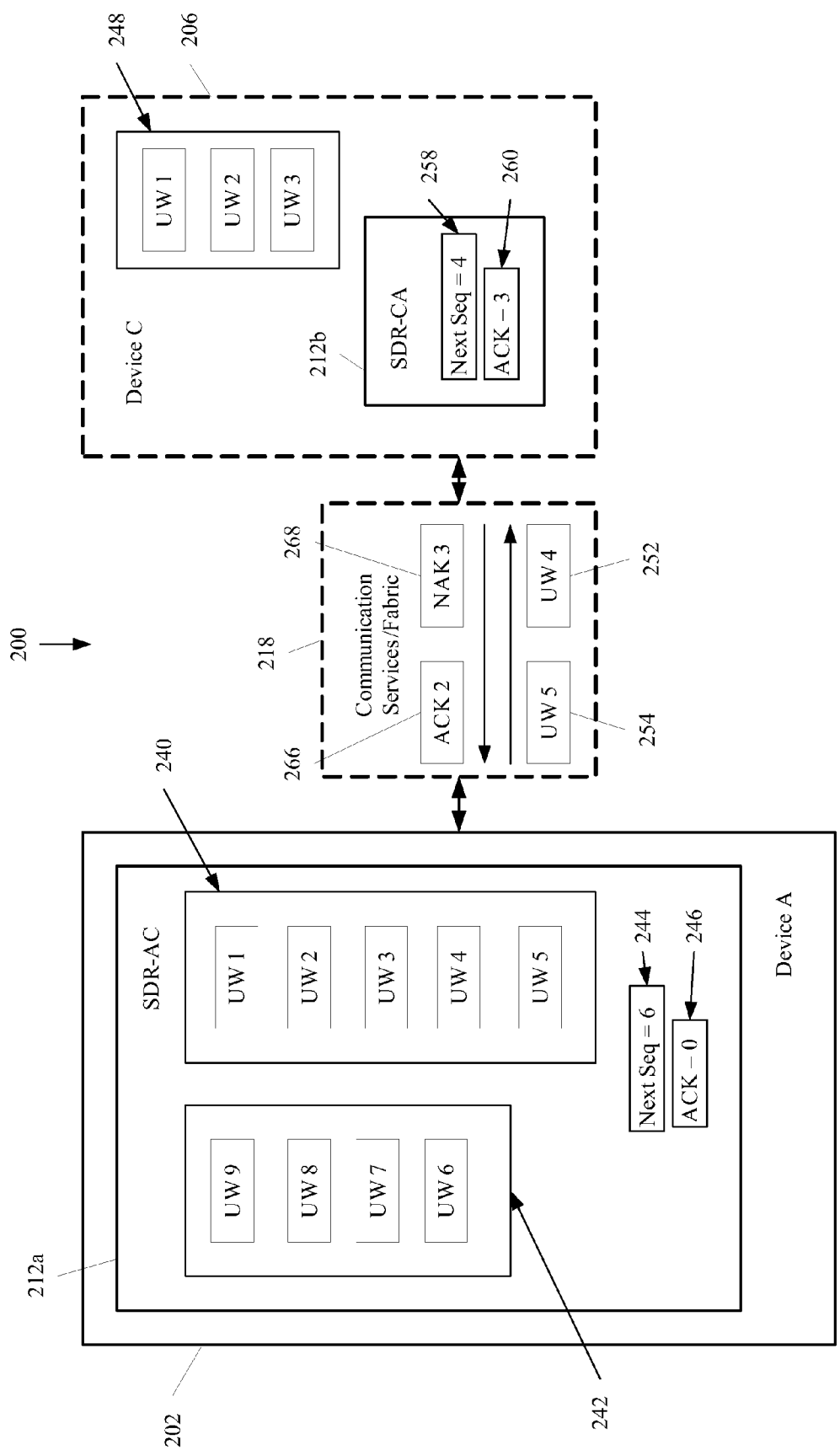
FIG. 7 is a diagram illustrating another example transmission operation between a source device and a destination device for the data processing system of FIG. 4.

Another example transmission operation between source device A indicated at 202 and destination device C indicated at to 206 for data processing system 200 is illustrated in diagram form in FIG. 7. In the transmission operation of FIG. 7, the state of SDR resources 212a of device 202 are substantially similar to the state of SDR resources 212a in the transmission operation of FIG. 6. Thus at the time indicated in FIG. 7, queue 240 of device 202 includes: UW1; UW2; UW3; UW4; and UW5. Queue 242 includes UW6; UW7; UW8; and UW9. The expected next sequence number value 244 is equal to 6 and the ACK value 246 is equal to 0. In addition at the time indicated in FIG. 7, device 206 has received UW1, UW2, and UW3 into queue 248. Also similar to the transmission operation illustrated in FIG. 6, SDR resources 212b include the expected next sequence number value 258 equal to 4 and the ACK value 260 equal to 3. Additionally, UW4 and UW5 are on the communication services/fabric 218 as indicated at 252 and 254 respectively.

However, in the transmission operation of FIG. 7, SDR resources 212b of device 206 have issued a cumulative ACK for UW1 and UW2, as indicated at 266. In addition, SDR resources 212b of device 206 have issued a NAK for UW3, as indicated at 268. In one embodiment, the NAK for UW3 indicated at 268 also contains an error code to indicate the type of error detected to facilitate the resynchronization process. For example, if a CRC error is detected, UW3 can be transparently retransmitted without involving the source AI. If, however, the detected error is that the destination AI is not operational, the source AI needs to be informed that UW3 and any other units of work which target the destination AI have failed. Once the source AI has been informed that UW3 and any other units of work which target the destination AI have failed, the source AI determines the necessary recovery technique to be used. For such a non-operational destination AI error, devices 202 and 206 increment the ACK value indicated respectively at 246 and 260 and the expected next sequence number value respectively indicated at 244 and 258, because a resynchronization operation is not required and subsequent units of work in-flight or to be transmitted can be processed as though the error did not occur assuming that the units of work target different destination AIs.

Figure 8:
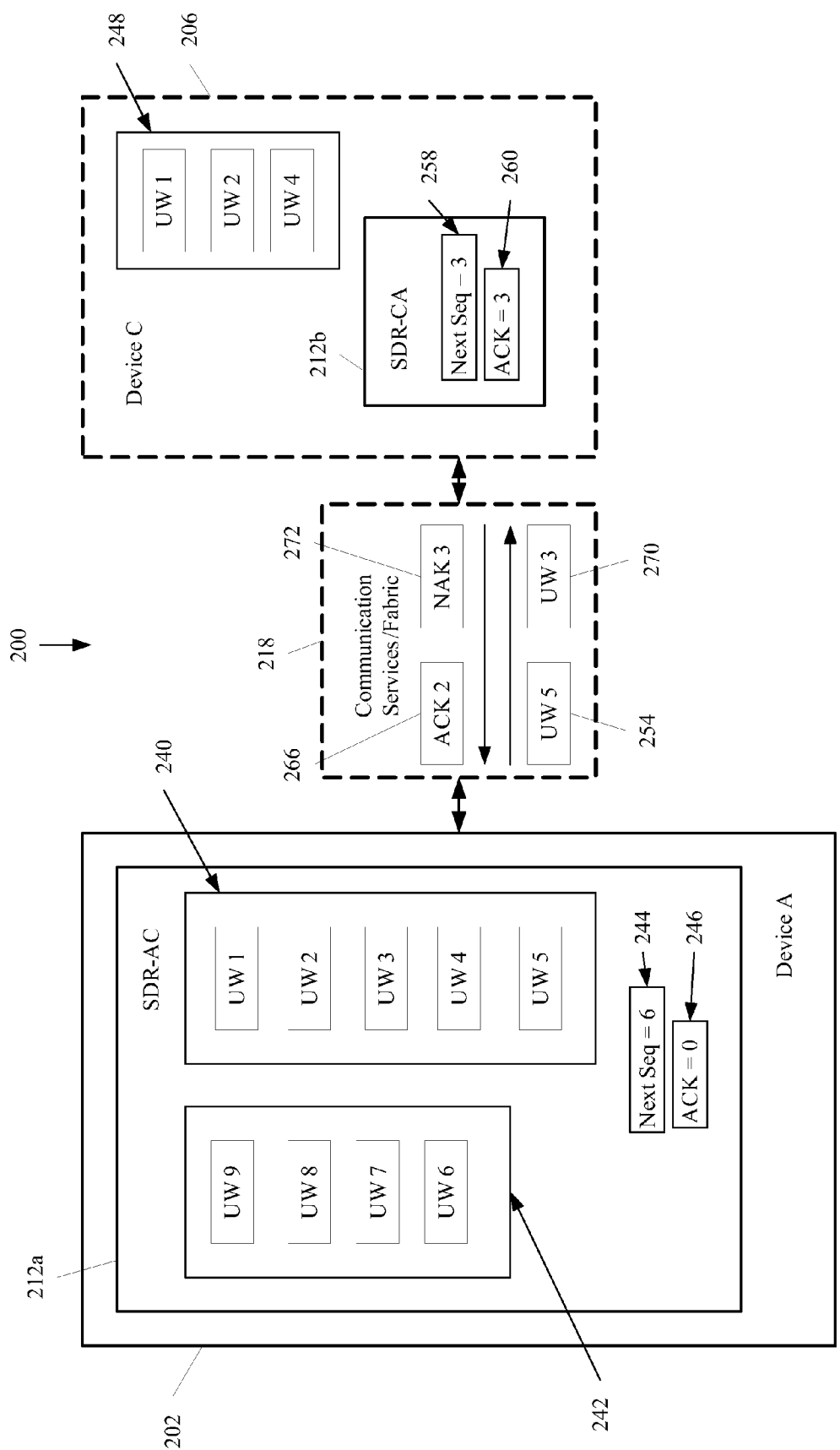
FIG. 8 is a diagram illustrating another example transmission operation between a source device and a destination device for the data processing system of FIG. 4.

Another example transmission operation between source device A indicated at 202 and destination device C indicated at 206 for data processing system 200 is illustrated in diagram form in FIG. 8. The example transmission operation of FIG. 8 illustrates that the reliable datagram service according to the present invention guarantees strong ordering of the received units of work at destination device 206 when the units of work flow through the same SDR (e.g., SDR 212).

In the transmission operation of FIG. 8, the state of SDR resources 212a of device 202 are substantially similar to the state of SDR resources 212a in the transmission operations of FIGS. 6 and 7. Thus, at the time indicated in FIG. 8, queue 240 of device 202 includes: UW1; UW2; UW3; UW4; and UW5. Queue 242 includes UW6; UW7; UW8; and UW9. The expected next sequence number value 244 is equal to 6 and the ACK value 246 is equal to 0.

However, in the example transmission operation of FIG. 8, the expected next sequence number value 258 of SDR resources 212b of destination device 206 is equal to 3 indicating that SDR resources 212b are expecting UW3 as the next unit of work in the serial unit of work stream from SDR resources 212a of source device 202. However, queue 248 of device 206 has received UW1, UW2, and UW4. In addition, as indicated at 270, UW3 is still on the communication services/fabric 218 behind the already received UW4 and just ahead of UW5, indicated at 254, in the serial unit of work stream from SDR resources 212a of source device 202. Although the transmission operation of FIG. 8 has UW3 out of its defined order in the unit of work stream by one unit of work position to more clearly illustrate a strong ordering violation, typically a strong ordering violation occurs when a unit of work is completely missing from the unit of work stream. SDR resources 212b have issued a cumulative ACK for UW1 and UW2 as indicated at 266. SDR resources 212*b* have also issued a NAK for UW3, as indicated at 272, which indicates a sequence number violation (i.e., a strong ordering protocol violation). In this example, the SDR sequence number of the protocol header of UW4 is equal to 4 which is larger than the expected next sequence number value 258, which is equal to 3. This strong ordering protocol violation in this example transmission operation indicates that UW3 is missing. Thus, SDRs 212*a* and 212*b* are resynchronized as the result of the NAK of UW3 indicated at 272.

Error Detection and Processing

Error detection and processing with the reliable datagram service according to the present invention is a function of the underlying communication services/fabric and the type of communication (e.g., sender-based or receiver-based communication) being employed. The underlying communication services/fabric and the type of communication being employed each provide error detection services which are generally independent of whether a given data processing system employs a reliable datagram service to communicate. Therefore, the following description is restricted to a description of the detection and processing of the type of errors which directly impact the reliable datagram service operation according to the present invention.

A first type of error which directly impacts the reliable datagram service operation is a protocol violation. A first type of protocol violation is a protection related violation. Examples of protection violations include: the unit of work protocol header containing invalid protection keys; invalid access right request (e.g., the request is to write to memory window but the destination AI has designated the memory window as read-only); memory address and bounds check violation; and the like. The protection errors are detected and a NAK is generated indicating the protection error so that the source AI can take appropriate corrective actions. The NAK in response to the protection error acts as a SDR acknowledgment and does not require a resynchronization event to be initialized.

A second type of protocol violation error is a sequence number error. A sequence number error occurs when the SDR sequence number field of the protocol header is either smaller or larger than the expected sequence number of the destination SDR resources. The SDR sequence number field value being less than the expected next sequence number value stored in the destination SDR resources indicates that the unit of work is a duplicate unit of work. The SDR sequence number field value being greater than the expected SDR sequence number value stored in the destination SDR resources indicates that the current unit of work is received ahead of its defined order, and thus, an intermediate unit of work corresponding to the expected next sequence number value is missing.

In one implementation, the sequence number check is actually a valid sequence number window check. In this implementation, sequence numbers are implemented using a fixed range (e.g., a 32-bit range yields 4 billion values). Within this range, a valid window is used to determine whether a unit of work is valid or not valid. This is a sliding window to account for the eventual sequence number roll-over. In one embodiment, sequence number check is implemented as representing half of the entire range (e.g., 2 billion if using a 32-bit sequence number). If the unit of work is within this range and less than what is expected, then it is a duplicate. If it is greater than the value, then either it is outside the window or it indicates that an intermediate unit of work was lost within the fabric. This will result in the unit of work being dropped, silently accepted but not completed, or a NAK can be generated indicating unit of work was dropped. Thus, in this implementation, the sequence number validation is a window validation check and the window is a sliding window.

The SDRs are resynchronized as a result of a sequence number error. In one embodiment, if the unit of work is determined to be a duplicate, the unit of work is silently dropped by the destination SDR resources. In one embodiment, the destination SDR resources drop the duplicate unit of work and provide an ACK indicating to the source SDR resources that the last unit of work was received to avoid the source SDR resources from again transmitting the duplicate unit of work in case the previous ACK corresponding the firstly received unit of work with the same SDR sequence number was dropped.

If the current unit of work is received ahead of its defined order indicating that an intermediate unit of work is missing as a result of the SDR sequence number field value being greater than the expected SDR sequence number, the destination SDR resources can take one of several actions. In one embodiment, the destination SDR resources silently drop the unit of work and await the source SDR resources to retransmit the missing unit of work based, for example, on a timer expiring. In one embodiment, the destination SDR resources generate a NAK in response to the indication that the unit of work is received ahead of its defined order and optionally drop the unit of work or temporarily store the unit of work into a received but unacknowledged queue. The NAK generated by the destination SDR resources informs the source SDR resources of the sequence number error and the expected next sequence number value. In one embodiment, the source SDR resources selectively retransmit unacknowledged units of work in response to the NAK indicating that a unit of work was received ahead of its defined order. In one embodiment, the source SDR resources retransmit all unacknowledged units of work in response to the NAK indicating that a unit of work was received ahead of its defined order.

Another type of error that directly impacts the reliable datagram service operation is the receipt of a corrupt unit of work. In this type of error, the unit of work or the attached protocol header is corrupted, such as by a CRC violation. In some situations, the destination device is not capable of trusting any portion of the unit of work when the receipt of a corrupt unit of work error occurs. In these situations, the destination device drops the unit of work and generates a NAK indicating the unit of work was corrupted. The next expected sequence number is included in the NAK so that the source device can determine which units of work are possibly lost and retransmit the unacknowledged units of work. The SDRs are resynchronized as a result of the receipt of a corrupt unit of work error.

Another type of error that directly impacts the reliable datagram service operation is a source AI or a destination AI abort error. No matter where the source AI or destination AI abort error occurs, the units of work which are in-flight either need to be flushed or completed so that all resources can be recovered. In one embodiment, if the source AI is aborted, the source device invalidates the unacknowledged units of work, employs a small control structure to account for all in-flight units of work so that the units of work can be completed even though the units of work are no longer valid, and shuts down communications. The source AI and destination AI abort error does not require a resynchronization event, and the flush operation is treated as a series of acknowledgements to insure all units of work on both sides of the <source, destination> device tuple have been acknowledged and all resources have been recovered.

Another type of error that directly impacts the reliable datagram service operation is the invalid destination AI error. The invalid destination AI error occurs when a source AI sends a unit of work to a destination AI which never was valid or is no longer valid. The destination device generates a NAK indicating the invalid DAI error for each unit of work targeting the invalid destination AI. The source device completes the units of work as normal and no resynchronization event is required with the invalid destination AI error.

Quality of Service

In one embodiment, quality of service (QoS) is implemented with the reliable datagram service according to the present invention by segregating the source AI traffic across a set of replicated SDRs. QoS relates to the scheduling of resources and AIs via service policies. QoS also relates to the employment of the service policies to effect the throughput and response times of a given AI unit of work stream.

Each SDR coupled between a <source, destination> tuple can be scheduled independently by the source device, the destination device, and the underlying communication services/fabric. This type of independent scheduling allows an application independent QoS policy to be implemented by middleware AIs. In one embodiment, each SDR is assigned a unique QoS. In one embodiment, SDRs are grouped into QoS levels where each QoS level is assigned a unique QoS.

Replicating SDRs creates the following generalized application benefits. First, AI communication resource contention is reduced because the communication resource contention can be spread across the multiple SDRs. Secondly, the number of AIs impacted by a given AI's behavior is reduced. As an illustrative example, strong ordering is preserved, in part, because a given unit of work transmission must be completed before subsequent unit of work transmissions can be acknowledged and completed. Therefore, if two source AIs are sharing the same SDR, the order that the source AIs issue requests is maintained by the SDR.

A third benefit to replicating SDRs is that when an error occurs, only the AIs employing the impacted SDR(s) are effected. Thus, all other AIs can continue to operate depending upon the error type. Transient errors, such as a CRC error, are recoverable. Hard errors, such as an error occurring because a physical link between AIs has failed, are recoverable if an alternative path physical link exists between the AIs and sufficient state information is available to successfully perform the replacement of the failed physical link with the alternative path physical link.

Figure 9:
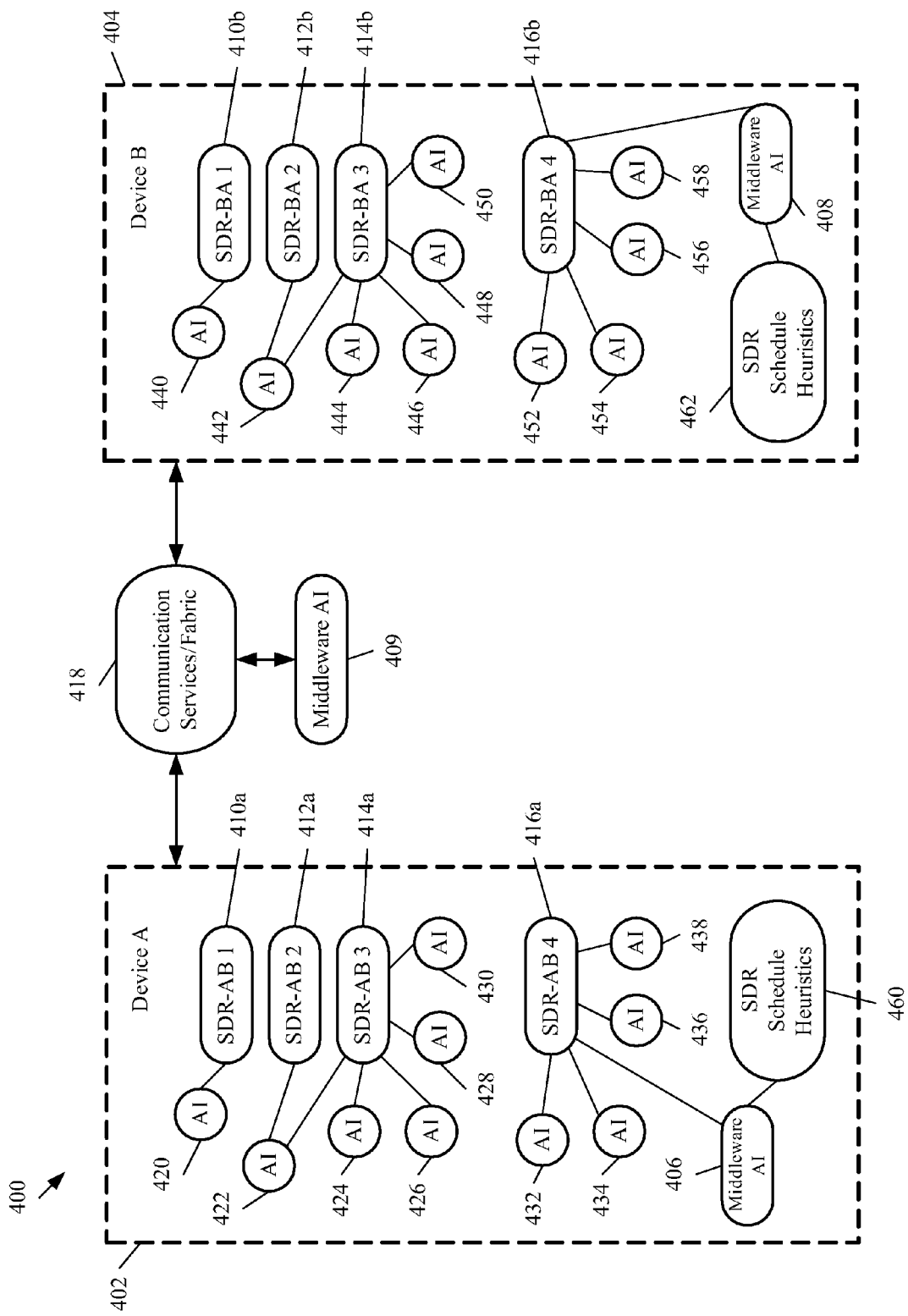
FIG. 9 is a diagram of a portion of a data processing system according to the present invention having multiple SDRs established between device pairs.

A portion of a data processing system having multiple SDRs established between device pairs according to the present invention is illustrated generally at 400 in FIG. 9. Data processing system 400 includes a reliable datagram service according to the present invention which has improved application performance and scalability because middleware AIs in data processing system 400 establish multiple SDRs between a device A indicated at 402 and a device B indicated at 404. An example middleware AI for device 402 is indicated at 406. An example middleware AI for device 404 is indicated at 408.

A SDR 410 including SDR resources 410a at device 402 and SDR resources 410b at device 404 implements a reliable datagram service between device 402 and device 404. A SDR 412 including SDR resources 412a at device 402 and SDR resources 412b at device 404 implements a reliable datagram service between device 402 and device 404. A SDR 414 including SDR resources 414a at device 402 and SDR resources 414b at device 404 implements a reliable datagram service between device 402 and device 404. A SDR 416 including SDR resources 416a at device 402 and SDR resources 416b at device 404 implements a reliable datagram service between device 402 and device 404. The source and destination ends of each of the SDRs 410, 412, 414, and 416 communicate via a communication services/fabric 418. Device 402 and device 404 can each be a source or a destination device depending on the direction of communication.

Thus, device A indicated at 402 and device B indicated at 404 communicate together via reliable datagram service provided by four established SDRs 410, 412, 414 and 416. The example configuration illustrated in FIG. 9 is for illustrative purposes only and similar configurations can be established between an arbitrary number of devices. As illustrated in FIG. 9, a set of AIs are bound to each SDR restricting the impact any AI has on another AI to generally only occur if the AIs share the same SDR.

In the example embodiment illustrated in FIG. 9, device 402 includes an AI 420 coupled to SDR resources 410a; and AI 422 coupled to SDR resources 412a and SDR resources 414a; AIs 424, 426, 428, and 430 each coupled to SDR resources 414a; and AIs 432, 434, 436, and 438 each coupled to SDR resources 416a. Device 404 includes an AI 440 coupled to SDR resources 410b; an AI 442 coupled to SDR resources 412b and SDR resources 414b; AIs 444, 446, 448, and 450 each coupled to SDR resources 414b; and AIs 452, 454, 456, and 458 each coupled to SDR resources 416b.

SDR resources 410a, 412a, 414a, and 416a are serviced based on the scheduling heuristics maintained at SDR schedule heuristics 460 in device 402. Similarly, SDR resources 410b, 412b, 414b, and 416b are serviced based on the scheduling heuristics maintained at SDR schedule heuristics 462 in device 404. In this way, SDR schedule heuristics are used to adjust the scheduling rate to create different QoS for the AIs bound to the SDRs.

In the embodiment illustrated in FIG. 9, AI 420 and AI 440 are exclusively assigned to SDR 410. When and if two AIs, such as AIs 420 and 440, are exclusively assigned to one SDR is determined by: a middleware AI local to a device, such as middleware AI 406 of device 402 and middleware AI 408 of device 404; a middleware AI executing remotely and acting as a central manager, such as middleware AI 409, which is accessed via the underlining communication services/fabric 418; and/or an application policy heuristics, such as stored at SDR schedule heuristics 460 of device 402 and SDR schedule heuristics 462 of device 404. Normally, such a decision is based on the application or device service level objectives.

A given AI, such as AI 422 and AI 442, can be bound to multiple SDRs if the given AI establishes multiple reliable datagram endpoints to communicate through. In such a case, each endpoint is serviced based on SDR scheduling heuristics, such as stored at SDR schedule heuristics 460 in device 402 and at SDR schedule heuristics 462 in device 404.

Establishing multiple SDRs between any two devices in data processing system 400 over which multiple AIs may operate provides the following benefits. Since each SDR is generally mutually independent from other SDRs, the behavior of the AIs bound to one SDR does not generally impact the behavior of AIs bound to another SDR. For example, an AI which processes large units of work can be bound to a different SDR so that it does not impact the performance of an AI which processes small units of work.

Another benefit of establishing multiple SDRs between two devices in data processing system 400 is that errors which occur on one SDR generally do not impact the behavior of AIs bound to another SDR. In addition, error recovery may be shorter or simplified depending upon the number of SDRs between any two devices and the type of error detected (e.g., transient, protcol, communication services failure, and the like).

Another benefit of establishing multiple SDRs between two devices in data processing system 400 is that a middleware AI, such as middleware AI 406 of device 402, may modify the SDR scheduling heuristics, such as SDR schedule heuristics 460 of device 402, to transparently adjust the service rate a given AI receives relative to other AIs. For example, an AI which is primarily processing high priority units of work can be bound to a SDR which is scheduled ahead of SDRs which are processing lower priority units of work. This modification of the SDR scheduling heuristics permits the middleware AI to create QoS policies based on the service level objectives associated with a given AI.

Another benefit of establishing multiple SDRs between two devices in data processing system 400 is that within a given priority band, multiple AIs may be segregated across multiple SDRs, with the SDRs within the priority band being serviced using simple scheduling policies, such as round-robin or weighted round-robin. The objective of the priority band being serviced using the simple scheduling policies is to reduce the potential contention on a given SDR to further limit the number of AIs impacted by a given AI's behavior when the SDR is shared among multiple AIs. The priority band being serviced using these simple scheduling policies improves AI scalability and overall performance of the applications. However, any type of arbitrary scheduling policies can be created for QoS.

In the reliable datagram service according to the present invention, striping refers to the technique of transmitting units of work over multiple SDRs from one source AI to one destination AI. If strong ordering is required when transmitting units of work from a source AI to a destination AI, the source AI needs to transmit the units of work on one SDR. But if weak ordering is possible when transmitting units of work from a source AI to a destination AI, the source AI can transmit the units of work on multiple SDRs (i.e., the source AI can employ striping) with some priority scheme, but with the potential that strong ordering is not maintained. For example, most multi-media applications can be transmitted with striping so that resolution at the receiving end improves over time, but without the pixels arriving in a strongly ordered manner.

As to establishing multiple SDRs for a given device pair, the reliable datagram service according to the present invention provides no limit on the number of SDRs which can be established between the given device pair. There are, however, practical design considerations to limit the number of SDRs established between a given device pair. For example, each added SDR includes corresponding added physical resources. Moreover, additional resources are required to schedule the unit of work traffic between the given device pair across multiple SDRs and the scheduling becomes more complex as the number of SDRs are increased. In addition, the number of priority levels assigned to the multiple SDRs is preferably kept at a practical design number. Thus, the number of the SDRs to establish between a given device pair and the priority levels to be assigned to the multiple SDRs is limited only by implementation design considerations.

Advantages of Reliable Datagram Service

As discussed in the Background of the Invention section of the present specification, AIs employing a reliable connection service must create one dedicated resource set per destination AI. By contrast, AIs employing the reliable datagram service according to the present invention can re-use the same resource set per multiple destination AIs. Thus, the reliable datagram service according to the present invention reduces the number of resource sets to create and manage which accordingly reduces AI implementation cost and design complexity. In this way, the reliable datagram service according to the present invention provides for highly scalable data processing systems.

Even though the reliable datagram service according to the present invention provides for highly scalable data processing systems, the reliable datagram service provides reliable communication between AIs including guaranteed ordering of units of work transmitted between AIs. The reliable datagram service according to the present invention provides the reliability of the reliable connection service described in the Background of the Invention section of the present specification by guaranteeing that the unit of work transmission is reliable so that AIs employing the reliable datagram service can rely on the underlying communication services/fabric to correctly deliver the units of work or on error notification in the event of an unrecoverable error. In this way, the reliable datagram service according to the present invention permits an AI to effectively off-load unit of work delivery to the reliable datagram service which reduces AI development costs.

Moreover, in one embodiment of a data processing system according to the present invention, unreliable datagram service is simultaneously supported on a communication services/fabric which supports reliable datagram service. In one embodiment, unreliable datagram service is simultaneously supported along with reliable datagram service by tagging a unit of work as unreliable and avoiding acknowledgment/error processing actions. In one embodiment, an unreliable datagram service is simultaneously supported along with a reliable datagram service by treating all data as reliable, and as a result, never entering an application unit of work recovery algorithm.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A data processing system comprising:
a source device having at least one source application instance (AI) configured to produce units of work;
a destination device having at least one destination AI configured to consume units of work;
communication services/fabric providing communication between the source device and the destination device;
a first source and destination resource (SDR) including first source SDR resources in the source device and first destination SDR resources in the destination device and configured to implement a first reliable datagram service which permits at least one of one AI to one AI, one AI to many AIs, and many AIs to one AI reliable communication and is connectionless from the perspective of the AIs between the source device and the destination device, transmit a first unit of work stream over the communication services/fabric, and guarantee strong ordering of the first unit of work stream received at the destination device; and a second SDR independent from the first SDR and including second source SDR resources in the source device and second destination SDR resources in the destination device and configured to implement a second reliable datagram service which permits at least one of one AI to one AI, one AI to many AIs, and many AIs to one AI reliable communication and is connectionless from the perspective of the AIs between the source device and the destination device, transmit a second unit of work stream over the communication services/fabric, and guarantee strong ordering of the second unit of work stream received at the destination device.

2. The data processing system of claim 1 wherein the first SDR is assigned a first priority level for effecting throughput and response time of units of work transmitted by the first SDR and the second SDR is assigned a second priority level for effecting throughput and response time of units of work transmitted by the second SDR 3. The data processing system of claim 1 further comprising:

at least a third SDR independent from the first and second SDRs and configured to implement at least a third reliable datagram service between the source device and the destination device, wherein the SDRs are grouped into multiple SDR groups, wherein each of the multiple SDR groups includes at least one SDR and is assigned a unique priority level for effecting throughput and response time of units of work transmitted by the at least one SDR.

4. The data processing system of claim 3 wherein the SDRs within at least one of the multiple SDR groups having multiple SDRs are serviced based on simple scheduling policies.

5. The data processing system of claim 4 wherein the simple scheduling policies comprise at least one of round-robin scheduling policies and weighted round-robin scheduling policies.

6. The data processing system of claim 1 further comprising:

SDR scheduling heuristics configured to adjust a first scheduling rate of the first SDR and a second scheduling rate of the second SDR.

7. The data processing system of claim 6 wherein the first and second scheduling rates respectively create different quality of service (QoS) for AIs respectively bound to the first and second SDRs to transparently, from the perspective of the AIs, adjust QoS a respective AI receives relative to at least one other AI.

8. The data processing system of claim 1 wherein the first unit of work stream and the second unit of work stream are produced by one source AI and consumed by one destination AI.

9. The data processing system of claim 1 wherein the source device is configured to also function as a destination device and the destination device is configured to also function as a source device.

10. The data processing system of claim 1 wherein the first and second destination SDR resources are each configured to provide a negative acknowledgement (NAK) for a unit of work received ahead of its defined order.

11. The data processing system of claim 10 wherein the first and second source SDR resources are each configured to respond to the NAK by performing one of retransmitting all unacknowledged units of work or selectively retransmitting unacknowledged units of work.

12. The data processing system of claim 1 wherein the first and second destination SDR resources are each configured to drop a unit of work received ahead of its defined order.

13. The data processing system of claim 1 wherein the first and second destination SDR resources are each configured to provide at least one of a positive acknowledgement (ACK) for each unit of work which is successfully received and processed by the destination SDR resources and a cumulative positive ACK for a set of units of work that indicate that all units of work in the set of units of work up to and including a current unit of work have been successfully received and processed by the destination SDR resources.

14. The data processing system of claim 1 wherein:

each unit of work in the first and second serial unit of work streams transmitted respectively from the first and second source SDR resources includes a protocol header containing fields employed by the communication services/fabric to target the at least one destination AI;

the protocol header includes a SDR sequence number field indicating the defined order of its corresponding unit of work; and the first and second destination SDR resources include an expected next sequence number value indicating an expected defined order corresponding to the next unit of work to be received.

15. The data processing system of claim 14 wherein the SDR sequence number field value being less than the expected next sequence number value stored in the destination SDR resources indicates that the unit of work is a duplicate unit of work.

16. The data processing system of claim 14 wherein the first and second destination SDR resources are each configured to, if the SDR sequence number field value matches the expected next sequence number value, verify other protocol header fields and provide a positive acknowledgement (ACK) if the current unit of work is valid from the destination device's perspective and provide a NAK if the current unit of work is invalid from the destination device's perspective.

17. The data processing system of claim 14 wherein the SDR sequence number field value being greater than the expected next sequence number value indicates that the unit of work is received ahead of its defined order.

18. The data processing system of claim 17 wherein the first and second destination SDR resources are each configured to provide a NAK in response to the indication that the unit of work is received ahead of its defined order contains the expected next sequence number value in the SDR sequence number field of the protocol header of the NAK to indicate to the respective source SDR resources that an intermediate unit of work corresponding to the expected next sequence number value is missing.

19. The data processing system of claim 18 wherein the first and second source SDR resources are each configured to respond to the NAK and retransmit all units of work having an assigned SDR sequence number value equal to or greater than the SDR sequence number value corresponding to the missing intermediate unit of work.

20. The data processing system of claim 17 wherein the first and second destination SDR resources are each configured to verify other protocol header fields in response to the indication that the unit of work is received ahead of its defined order and temporarily store the unit of work if the other verification checks pass.

21. The data processing system of claim 20 wherein the data processing system further comprises:

at least one middleware AI configured to perform a resynchronization operation to recover a missing intermediate unit of work corresponding to the expected next sequence number value if the other verification checks pass.

22. A method of processing data comprising:
producing units of work with at least one source application instance (AI) at a source device;
consuming units of work with at least one destination AI at a destination device;
establishing a first reliable datagram service which permits at least one of one AI to one AI, one AI to many AIs, and many AIs to one AI reliable communication and is connectionless from the perspective of the AIs, with a first source and destination resource (SDR), between the source device and the destination device;
establishing a second reliable datagram service which permits at least one of one AI to one AI, one AI to many AIs, and many AIs to one AI reliable communication and is connectionless from the perspective of the AIs, with a second SDR independent of the first SDR, between the source device and the destination device;
transmitting a first unit of work stream over a communication services/fabric with the first reliable datagram service;
guaranteeing strong ordering of the first unit of work stream received at the destination device with the first reliable datagram service;
transmitting a second unit of work stream over the communication services/fabric with the second reliable datagram service; and
guaranteeing strong ordering of the second unit of work stream received at the destination device with the second reliable datagram service.

23. The method of claim 22 further comprising:
assigning a first priority level to the first SDR for effecting throughput and response time of units of work transmitted by the first SDR; and
assigning a second priority level to the second SDR for effecting throughput and response time of units of work transmitted by the second SDR.

24. The method of claim 22 further comprising:
establishing at least a third reliable datagram service, with at least a third SDR independent of the first and second SDRs, between the source device and the destination device;
grouping the SDRs into multiple SDR groups, wherein each of the multiple SDR groups includes at least SDR; and
assigning a unique priority level to each SDR group for effecting throughput and response time of units of work transmitted by the at least one SDR in each SDR group.

25. The method of claim 22 further comprising:
storing scheduling heuristics;
adjusting a first scheduling rate of the first SDR based on the stored scheduling heuristics; and
adjusting a second scheduling rate of the second SDR based on the stored scheduling heuristics.

* * * * *